United States Patent [19]

Katz

[11] Patent Number: 4,759,814
[45] Date of Patent: Jul. 26, 1988

[54] METHODS FOR COATING AND LAMINATING FLEXIBLE, TUBULAR-SHAPED ARTICLES; COATED FLEXIBLE TUBULAR-SHAPED ARTICLES AND FLEXIBLE MULTILAYER ARTICLES OF FLAT OR TUBULAR SHAPE

[75] Inventor: Donald P. Katz, Carmel, Ind.

[73] Assignee: Max Katz Bag Company, Inc., Indianapolis, Ind.

[21] Appl. No.: 870,239

[22] Filed: Jun. 3, 1986

[51] Int. Cl.⁴ ............................................. B29D 23/04
[52] U.S. Cl. ................................... 156/198; 156/201; 156/244.12; 156/244.14; 156/244.27; 264/516
[58] Field of Search ...................... 156/244.11, 244.12, 156/244.13, 244.15, 244.25, 244.27, 244.14, 198, 200, 196, 199, 201, 243, 215, 461, 213; 264/512, 514, 516, 172, 173

[56] References Cited

U.S. PATENT DOCUMENTS

| | | | |
|---|---|---|---|
| 3,205,913 | 9/1965 | Ehlers | 138/125 |
| 3,652,368 | 3/1972 | Formo | 156/501 |
| 3,799,825 | 3/1974 | Champleboux | 156/215 X |
| 3,939,875 | 2/1976 | Osborn et al. | 138/178 |
| 4,126,262 | 11/1978 | Thompson et al. | 229/176 |
| 4,212,695 | 7/1980 | Bosse et al. | 156/244.12 X |
| 4,231,832 | 11/1980 | Weikert | 156/244.14 |
| 4,364,981 | 12/1982 | Horner | 428/35 |
| 4,397,337 | 8/1983 | Porrmann et al. | 138/118.1 |
| 4,401,135 | 8/1983 | Andrä et al. | 138/118.1 |
| 4,401,136 | 8/1983 | Porrmann et al. | 138/118.1 |
| 4,450,028 | 5/1984 | Vilutis | 156/198 |

*Primary Examiner*—David Simmons
*Attorney, Agent, or Firm*—Willian Brinks Olds Hofer Gilson & Lione

[57] ABSTRACT

Method for (1) extrusion coating flexible, tubular-shaped articles without producing fragile edges or weakened areas in the coating or in the material of the article and to coated articles manufactured thereby; (2) method for extrusion coating and laminating tubular-shaped articles; and (3) flexible, multilayer articles of flat or tubular shape composed of a plurality of layers of plastic fabric or other material laminated together by one or more intermediate, fully embedded barrier layers. The method comprises covering the surface of the flexible, tubular-shaped article in at least three contiguous sections around the circumference of the article to provide a substantially continuous covering without weakened areas through which leakage can occur.

19 Claims, 1 Drawing Sheet

METHODS FOR COATING AND LAMINATING FLEXIBLE, TUBULAR-SHAPED ARTICLES; COATED FLEXIBLE TUBULAR-SHAPED ARTICLES AND FLEXIBLE MULTILAYER ARTICLES OF FLAT OR TUBULAR SHAPE

BACKGROUND OF THE INVENTION

The present invention relates generally to methods for extrusion coating and for extrusion coating and laminating flexible tubular-shaped articles, to coated tubular-shaped articles and to flexible, multilayer, articles of flat or tubular shape.

In many applications utilizing flexible plastic articles, it is important that the articles be exceptionally strong and/or exhibit superior barrier properties. Flexible plastic bags, for example, are commonly made with walls formed of a plastic fabric, such as a woven plastic fabric, to which a thin film or coating of solid plastic is applied. The fabric layer provides the bag with strength and the ability to resist breaking or tearing, and the solid coating functions as a barrier layer to prevent leakage. Examples of articles which require superior strength and/or barrier properties include flexible containers of many types, for example, bags such as bulk, blasting, cement, feed and containment bags; bale wraps, pallet or unitizing wraps; and conveying, capture and/or transport tubing.

Many articles currently on the market are not fully satisfactory. For one thing, most plastic-coated fabrics are simply not fully effective in retaining many fine powders or gel-like materials without some leakage, particularly for extended periods of time. Accordingly, for many applications, it is necessary to provide the article with a separate inner liner to more reliably retain the contents of the article.

In addition, the solid plastic coating is sometimes applied to the outer surface of the article. In such articles, the thin, fragile coating is exposed to the outside environment and is highly susceptible to being punctured, abraded, or otherwise damaged such that its effectiveness as a barrier is lessened or destroyed.

To help protect the fragile coating, the solid plastic layer is often applied to the inner surface of the article. With such a construction, however, the coating is still exposed to the contents of the article and can be easily damaged thereby.

Flexible plastic articles are frequently manufactured from coated, flexible, plastic fabric tubing. To coat the tubing, the tubing is first collapsed upon itself to provide two generally flattened, opposed sides that are integrally and continuously connected together. A thin plastic coating is then applied to the outer surfaces of the flattened sides in a continuous extrusion-coating process to provide a coated, tubular-shaped article having a fabric inner layer and a thin, solid, plastic, outer coating.

This process is not fully satisfactory. Initially, the process tends to produce coatings which have weakened areas, particularly along the edges of the flattened sides where the coatings are joined together. Such weakened areas provide locations where the integrity of the coating is most likely to be broken and where leakage can occur. Secondly, the process often produces jagged portions of laminate which extend outwardly from the edges of the flattened, tubular-shaped article and which are usually removed by trimming. This trimming step not only increases manufacturing costs and results in a less attractive product, but is also extremely difficult, and if not done correctly, can nick and ruin the edge of the flattened tube. Thirdly, to properly apply the coating, a substantial force must be applied across the entire width of the flattened tube, including at the creased edges thereof. Such force can structurally damage the fabric tube, particularly at the creased edges. Fourthly, relatively heavy fabrics are not easily handled by conventional extrusion-laminating equipment, and, during coating, the edges of the flattened tube tend to move slightly or roll over leaving uncoated areas which will leak.

In addition, to simplify manufacturing procedures, the solid coating is usually applied to the outer surface of the fabric tube; and it is necessary to turn the cut lengths of tubing inside out to place the coating on the inner surface. This step can easily damage the fragile coating.

SUMMARY OF THE INVENTION

Briefly summarized, the present invention relates (1) to a method for extrusion coating flexible, tubular-shaped articles without producing fragile edges or weakened areas in the coating or in the material of the article and to coated articles manufactured thereby; (2) to a method for extrusion coating and laminating flexible tubular-shaped articles; and (3) to flexible, multilayer articles of flat or tubular shape composed of a plurality of layers of plastic fabric or other material laminated together by one or more intermediate, fully embedded barrier layers.

The method according to one aspect of the invention includes the steps of:

a. providing a flexible, tubular-shaped article;

b. nipping the tubular-shaped article at a first pair of diametrically opposed locations to generally collapse the tubular-shaped article upon itself to define a first pair of outer surfaces joined together at a first pair of edges;

c. applying a first covering portion to at least one of said first pair of surfaces, said first covering portion being positioned between said first pair of edges and having a width which is less than the width of said one of said first pair of surfaces;

d. expanding said collapsed tubular-shaped article and nipping said expanded tubular-shaped article at a second pair of diametrically opposed locations to generally collapse said tubular-shaped article upon itself to define a second pair of opposed outer surfaces joined together at a second pair of edges, said second pair of locations being displaced from said first pair of locations;

e. applying a second covering portion to at least one of said second pair of surfaces, said second covering portion being positioned between said second pair of edges and having a width which is less than the width of said one of said second pair of surfaces; and f. repeating steps d and e as necessary until the entire outer surface of said tubular-shaped article has a covering portion applied thereto.

The "covering" may include a single coating layer or a multiple layer coextruded coating applied to the tubular-shaped article such as by an extrusion-coating process, or a multiple layer covering applied, for example, by an extrusion-lamination process.

In accordance with a presently preferred embodiment, the tubular-shaped article is nipped at locations chosen such that each applied covering portion will slightly overlap adjacent covering portions, thus providing a covering that covers the entire surface of the tubular-shaped article and is reinforced at all seams between adjacent covering portions. According to one embodiment of the invention, a covering portion is applied to only one of said pairs of surfaces, the article is nipped at three diametrically opposed locations and the width of each covering portion is selected to be slightly greater than one-third the circumference of the tubular-shaped article such that the entire surface of the article can be covered by the application of three covering portions to the article. According to an alternative embodiment, a covering is applied to a portion of the first pair of surfaces in one coating operation per side. The partially covered article is expanded and recollapsed in an orientation such that the uncovered portions of the article will be positioned on the outer flat surfaces of the reoriented tube. A covering is applied to both remaining uncovered surfaces in one coating operation per side such that the entire surface of the article is covered by the application of four covering portions to the article.

A tubular-shaped article covered in accordance with the above method has a covering which has no weakened edges or other areas at which the covering is likely to leak or otherwise lose its integrity. The covering also does not require edge trimming as in many prior methods. In addition, because the covering is not applied at the creased edges of the collapsed tube, the application of any substantial forces at the edges of the collapsed tube can be avoided reducing the risk of structural damage to the material of the tube.

According to a presently preferred embodiment, the covering is preferably applied by a process in which the covering portions are applied simultaneously to a continuous, tubular-shaped article in a continuous extrusion-coating or extrusion-laminating process.

According to the invention, the above-described process can be practiced to apply a single covering to a tubular-shaped article as by extrusion-coating the several portions thereon, or to apply a multiple layer covering thereon as by extrusion laminating a plastic fabric or another material to the tube. When a material is extrusion laminated onto the tube, an article is provided in which the tubular-shaped article comprises the inner layer; the several sheets of fabric or other material laminated thereto become the outer layer; and the laminate becomes an intermediate barrier layer.

According to a further aspect of the present invention, a flexible, multilayer article of flat or tubular shape is provided which comprises a plurality of layers of, for example, plastic fabric, joined together by one or more fully embedded intermediate barrier layers. The barrier layers function as barriers to prevent leakage therethrough; and the layers of fabric or other material provide the article with strength and other desired properties.

A multilayer article in accordance with the present invention has its one or more barrier layers fully embedded within the walls of articles rather than exposed on the outside or inside surface thereof. The thin, fragile barrier layers are thus well-protected and are less susceptible to being punctured, abraded, or otherwise damaged during use. As a result, the walls are more likely to retain their integrity over extended periods of time, resulting in a product that has greater reliability and an increased useful life expectancy.

By being composed of a plurality of fabric layers, for example, rather than a single fabric layer, each fabric layer can be formed of a relatively lightweight fabric without any sacrifice in the overall strength of the product. The ability to use lightweight fabrics is a significant advantage because such fabrics are more easily accepted by conventional extrusion-laminating equipment, are more easily coated, and are usually substantially less expensive than heavyweight fabrics, often permitting a reduction in both manufacturing and material costs.

A further advantage of products constructed in accordance with present invention is that the plurality of fabric layers is, in itself, helpful in preventing leakage through the walls thereof. Specifically, the fabric layers may comprise woven fabric layers; and by providing a plurality of woven fabric layers closely adjacent one another, each layer tends to cover the openings or interstices in the weave pattern of the adjacent layers, thus tending to prevent leakage through the fabric layers even in the event of a break in the integrity of the barrier layers.

According to a further aspect of the invention, leakage can be further reduced by forming the woven fabric layers with fabric tapes of differing width. This ensures that greater numbers of openings in one layer will be covered by the fabric tapes of the adjacent layers, thus providing even fewer paths through which leakage can occur.

By using at least two layers of fabric or another material, it is also possible to construct the product with layers having different properties for specialized applications. For example, the inner layer could be made of an FDA-approved fabric; and the outer layer could be made of a material that will inhibit UV degradation of the fabric.

Further advantages and specific features of the invention will be set forth hereinafter in the following detailed description of the preferred embodiments taken in conjunction with the drawings.

DETAILED DESCRIPTION OF THE PREFERRED EMBODIMENTS

Figures 1, 2, 3A, 3B, 3C, 3D, 4, 5:
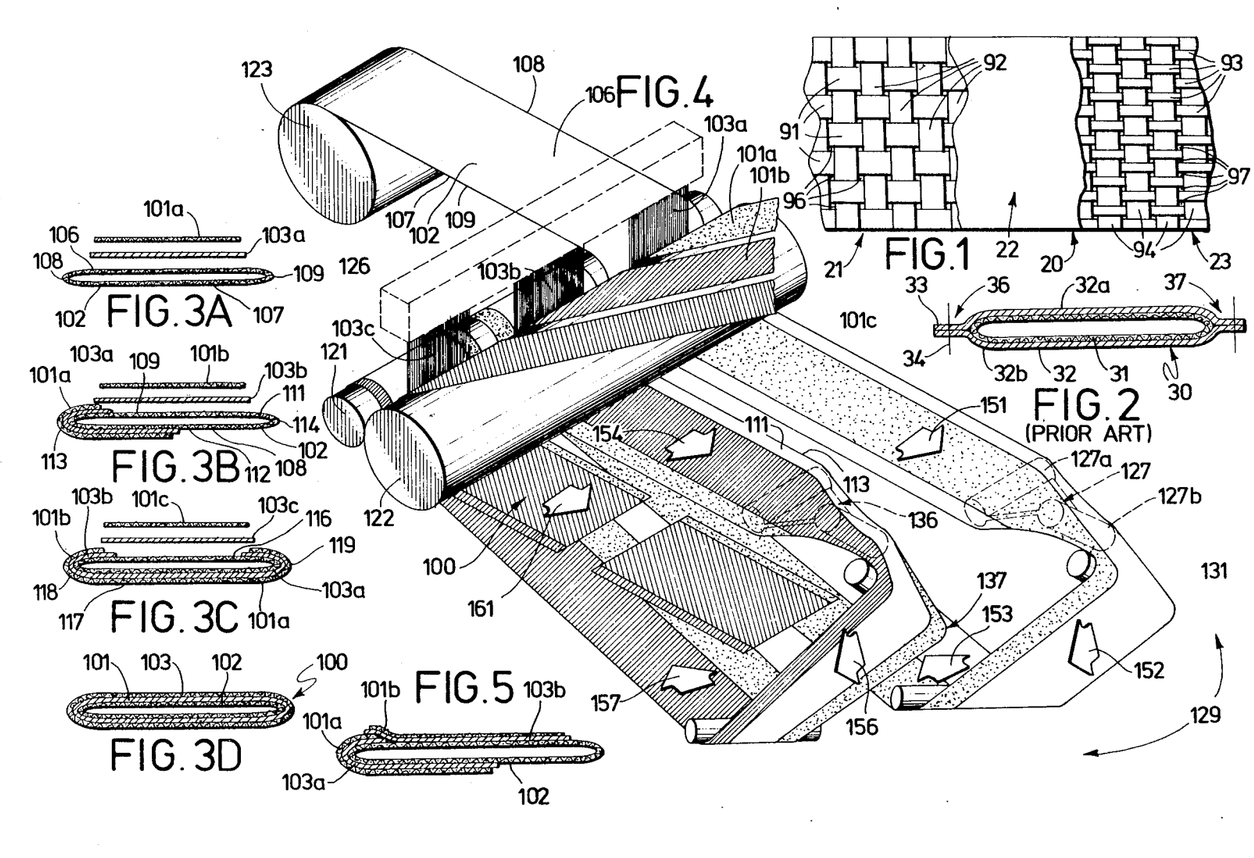
FIG. 1 schematically illustrates a section of a flexible, multilayer, plastic article according to a presently preferred embodiment of the invention with portions of the outer layers thereof removed to expose inner layers.
FIG. 2 is a cross-sectional view of a flexible, multilayer, tubular-shaped article manufactured by a prior art method.
FIGS. 3A–3D are cross-sectional views illustrating the steps of manufacturing a flexible multilayer, tubular-shaped article according to a presently preferred embodiment of the invention.
FIG. 4 schematically illustrates an extrusion-laminating system for manufacturing flexible, multilayer, tubular-shaped articles by the method illustrated in detail in FIGS. 3A–3D.
FIG. 5 schematically illustrates an important feature of the method of FIGS. 3A–3D.

FIG. 1 illustrates a section of a multilayer plastic article constructed in accordance with a preferred embodiment of the present invention. In FIG. 1, a flat sheet 20 is illustrated; however, it should be understood that the article could be of tubular shape or of another desired configuration. In FIG. 1, outer layers of the sheet have been partially removed to expose underlying layers. As shown, the article 20 is composed of an outer, woven, plastic-fabric layer 21; an inner, woven, plastic-fabric layer 23; and an intermediate, flexible, solid, plastic barrier layer 22.

Articles formed with walls having inner and outer fabric layers and an intermediate barrier layer provide a number of important advantages. Initially, the barrier layer is embedded within the fabric rather than exposed on the inside or outside surface thereof. Accordingly, the fragile barrier layer is well-protected and is less susceptible to being punctured or abraded. In addition, because the article contains two fabric layers, each layer can be formed of a relatively lightweight fabric, without any sacrifice in the overall strength of the article. Lightweight fabric layers are also more easily accepted by conventional extrusion-laminating equipment and are often less expensive than the heavier fabrics commonly used.

Fabric layers 21 and 23 preferably comprise layers of woven, plastic fabric formed of interwoven tapes of polypropylene, polyethylene, polyester or other suitable extrudable plastic materials commonly used in the art. The term "plastic" materials as used herein include any of numerous organic, synthetic or processed materials that are mostly thermoplastic or thermosetting polymers of high molecular weight and that can be molded, cast, extruded, drawn or laminated into objects, films or filaments. Solid plastic coating 22 can also comprise polypropylene, polyethylene, polyester or another material compatible with the material of the fabric layers.

Flat, multilayer, plastic sheets can be manufactured using conventional extrusion-laminating equipment by applying laminating material between two continuous sheets of woven fabric in a continuous extrusion-laminating process such that the laminating material will adhere the woven fabric sheets to one another and will define the intermediate barrier layer 22 therebetween. The continuous multilayer sheets so formed can be cut to the desired dimensions for use in any desired application.

Tubular, multilayer, plastic articles having inner and outer fabric layers and an intermediate, solid-plastic barrier layer can be made by the improved method illustrated schematically in FIGS. 3A–3D. For a better understanding of the invention, however, a known method for coating tubular-shaped articles will first be described with reference to FIG. 2.

In FIG. 2, a flexible, tubular-shaped article 30 is schematically illustrated in cross section and comprises a flexible tube 31 having a solid, plastic coating 32 adhered to the outer surface thereof. Tube 31 can be formed in any appropriate manner. For example, the tube can be a continuous extruded tube or fabric tube of circular-woven (non-seamed woven), plastic or other compatible material. Alternatively, the tube can be made from flat sheets of any compatible material which are seamed by conventional methods. To apply coating 32 to the fabric tube, the tube is substantially collapsed upon itself, as shown schematically in FIG. 2; and coating portions 32a and 32b are laminated to the opposed outer surfaces of the flattened tube, using conventional extrusion-coating equipment. After coating, the continuous, coated, tubular-shaped article is then cut to the desired length for use in manufacturing plastic bags or for other purposes.

The process illustrated in FIG. 2 results in the coating being applied to the outer surface of tube 31. In order to place the coating on the inside surface of the tube, it is necessary to turn the cut lengths inside out. The process of turning the cut lengths inside out can easily damage the fragile coating. The coating process also tends to produce jagged portions 33 of laminate material which extend outwardly from the ends of the collapsed tube. These jagged portions are usually removed by trimming as indicated by lines 34. The trimming process is an extremely difficult procedure and, if not done correctly, can nick and ruin the edges of the flattened tube.

The method illustrated in FIG. 2 also tends to produce coatings which have weakened areas, particularly along the edges or seams 36 and 37 where coating portions 32a and 32b are joined together. Such weakened areas provide locations where the integrity of the coating is most likely to be broken and where leakage can occur. It is particularly difficult to form good seams using the method illustrated in FIG. 2 when the tubular fabric being coated is relatively heavy, as heavy fabrics are susceptible to slight movement or rolling at the edges thereof which can leave uncoated areas on the fabric that will leak.

The method of FIG. 2 additionally necessitates that a substantial force be applied at the creased edges 36 and 37 to properly adhere the coatings thereat. Such force can structurally damage the material of the tube at the edges.

FIGS. 3A–3D schematically illustrate a method for applying a covering to a flexible, plastic, tubular-shaped article according to the present invention; and FIG. 4 illustrates a suitable system for practicing the method of FIGS. 3A–3D. The tubular-shaped article is generally designated by reference numeral 100 in FIG. 3D and comprises an outer woven fabric layer 101, an inner woven fabric layer 102, and an intermediate solid barrier layer 103. (The thicknesses of the layers are greatly exaggerated in FIGS. 3A–3D for clarity.) In practice, fabric layers 101 and 102 have a thickness commensurate with the strength required while solid layer 103 has a thickness of from less than one mil to six mils or more as required for the particular application. Generally, the thicker the layer 103, the better the bond between the inner and outer layers 101 and 102. Also, the layer 103 should usually be thicker if it is to be used in an article designed to store gel-like materials or very fine powders which are more difficult to store without leakage.

As the first step in the method of FIGS. 3A–3D, a continuous, tube 102 is provided, as shown in FIG. 3A. Tube 102 is then nipped at a first pair of diametrically opposed locations to generally collapse the tube upon itself to define a first pair of opposed outer surfaces 106 and 107 joined together at a first pair of edges 108 and 109.

A first flat sheet 101a of fabric is then laminated to the outer surface 106 by lamination material 103a applied between sheet 101a and surface 106 in a continuous extrusion-lamination process. As will become apparent hereinafter, lamination material 103a will become a portion of intermediate barrier layer 103 of finished article 100; and first sheet 101a will become a portion of outer fabric layer 101.

The width of sheet 101a is preferably chosen to be slightly greater than two-thirds the width of surface 106 (or slightly greater than one-third the circumference of tube 102). Thus, when applied, sheet 101a extends continuously along the length of surface 106 of continuous tube 102 and covers approximately two-thirds the surface 106. Sheet 101a is also preferably positioned on surface 106 such that its edges will be spaced from edges 108 and 109 of collapsed tube 102.

After sheet 101a has been applied, collapsed tube 102 with sheet 101a adhered thereto is expanded back into tubular shape, and then nipped at a second pair of diametrically opposed locations to again collapse the tube upon itself to define a second pair of opposed outer surfaces 111 and 112 joined together at a second pair of edges 113 and 114, as shown in FIG. 3B. As is also shown in FIG. 3B, the tube 102 is nipped at a second pair of locations which are displaced approximately 120° from the first pair of locations such that the second pair of edges 113 and 114 are displaced approximately 120° around the circumference of the tube from where the first pair of edges 108 and 109 were located as is also illustrated in FIG. 3B. As a result, sheet 101a covers a portion of each of surfaces 111 and 112, as shown, and extends around edge 113.

Thereafter, a second sheet 101b of fabric is laminated to the uncovered portion of surface 111 by lamination material 103b applied between sheet 101b and surface 111 in a continuous extrusion-lamination process. The width of sheet 101b is also slightly greater than two-thirds the width of surface 111 and slightly greater than one-third the circumference of tube 103, and extends from a position slightly spaced from edge 114 to, and slightly overlapping, sheet 101a. Preferably, the sheets are all slightly wider than one-third the circumference of tube 103 so that when applied to tube 103, they will slightly overlap one another to ensure that no gaps will be present between the sheets. FIG. 5 is an enlarged schematic view illustrating the manner in which sheet 101b and laminate 103b overlaps the edges of sheet 101a and laminate 103a. By providing such an overlap, the resulting seam between sheets 101a and 101b and between laminate layers 103a and 103b are reinforced to reduce the likelihood of leakage along the seam. The extent of overlap can be varied as desired for the particular application in which the tubular-shaped article is to be used.

After the step illustrated in FIG. 3B is completed, approximately two-thirds of the circumference of tube 103 will have a woven fabric layer laminated thereto. Thereafter, tube 103 is again expanded back into tubular shape and is nipped at a third pair of diametrically opposed locations to again collapse the tube upon itself to define a third pair of opposed outer surfaces 116 and 117 joined together at a third pair of edges 118 and 119. The third pair of locations is again displaced approximately 120° around the circumference of tube 102 from the second pair of locations such that applied sheets 101a and 101b cover portions of surface 116 and all of surface 117 and extend around both edges 118 and 119 as shown in FIG. 3C.

Thereafter a third sheet 101c of woven plastic fabric is laminated to the uncovered portion of surface 116 by lamination material 103c applied between sheet 101c and surface 116 in a continuous extrusion-lamination process. The width of sheet 101c is again slightly greater than two-thirds the width of surface 116 and extends between and slightly overlaps the edges of sheets 101a and 101b in the manner illustrated in FIG. 5.

After sheet 101c has been applied, the entire outer surface of tube 102 will be covered. Sheets 101a, 101b, and 101c will together define outer fabric layer 101 of tubular-shaped article 100; and laminate layers 103a, 103b, and 103c will together define intermediate barrier layer 103. Multilayer, tubular-shaped article 100 can then be cut to desired lengths for use or for further manufacturing.

The multilayer, tubular-shaped article manufactured, as shown in FIGS. 3A-3D does not require edge trimming as in prior methods. The solid barrier layer 103 is also uniform and essentially continuous throughout and has no weakened areas or unreinforced seams at which damage or leakage is likely to occur.

In addition, the covering is always applied to the surface of the flattened tube between the creased edges thereof. Therefore, the method does not require the application of any substantial force at the creased edges as in the prior method of FIG. 2 which can structurally damage the material of the tube.

Although, in the embodiment illustrated in FIGS. 3A-3D, the outer fabric layer and the intermediate barrier layer are applied in three sections, it should be understood that the method could be practiced by applying a greater number of sections to the tubular-shaped member, if desired. By applying the outer fabric layer and barrier layer in at least three sections, it becomes unnecessary to join adjacent sections to one another at the flattened edges of the tube 102 where weakened seams in the coating and structural damage to the material of the tube are most likely to occur.

The method illustrated in FIGS. 3A-3D can be modified, if desired, to apply only a coating layer to a tubular-shaped article by simply applying the laminate sections 103a, 103b, and 103c to the tube 102 without also applying the fabric sheets 101a, 101b, and 101c thereto. Such a modified method provides a fully coated, tubular-shaped article in which the coating is substantially continuous and without weakened areas.

The method of FIGS. 3A-3D can be used to laminate or extrusion coat plastic fabrics such as woven plastic fabrics. The method can also be practiced to laminate or coat diverse other materials. In one application, for example, a kraft paper can be laminated to a tubular-shaped article of plastic or another material to provide a multilayer, tubular-shaped article having an inner layer of plastic or the like, an outer kraft paper layer, and an intermediate, solid, plastic barrier layer.

The method of FIGS. 3A-3D also provides a number of other capabilities. By applying an outer covering in three or more sections, each section can be made of a different material, be of a different color or differ in other properties such as printability, strength and the like for particular applications. One section, for example, can be preprinted for labeling of the article. Also, it is possible to laminate and coat alternating sections, if desired.

FIG. 4 schematically illustrates a suitable apparatus which can be used to produce a tubular-shaped article having inner and outer fabric layers and an intermediate barrier layer by the method of FIGS. 3A-3D. Portions of the system have been omitted in FIG. 4 for clarity.

FIG. 4 illustrates a nip consisting of a pressure roll 121 and a chill roll 122 between which a flattened fabric tube 102 is fed from a supply roll 123. Tube 102 is flattened by being nipped at first pair of edges 108 and 109 to define upper surface 106 and lower surface 107.

As flattened tube 102 passes between rollers 121 and 122, a fabric sheet 101a, fed from a supply roll or other source, is laminated to surface 106 of tube 102 by applying laminate material 103a therebetween from a laminate supply means generally designated by reference numeral 126. As tube 102 is passed between the rollers 121 and 122, therefore, first fabric sheet 101a is laminated thereto, as shown in FIG. 3A.

Thereafter, the tube 102, moving in the direction of arrow 151, passes over and around a directional-orienting device 127 which is designed to expand the flattened tube 102 back into tubular form and then cause it to be nipped at the second pair of edges 113 and 114. Device 117 can be formed in various ways. In the illustrated embodiment, it comprises: a first roller 127a oriented with its axis substantially in the plane of movement of flattened tube 102 so as to cause the flattened tube to open up into tubular form as the tube passes thereover, and a second roller 127b oriented with its axis turned by slightly more than 120° relative to the axis of roller 127a. Second roller 127b defines the second pair of edges 113 and 114 at which the tube 102 is nipped as it passes over roller 127b and into nip and folding assembly 129.

Nip and folding assembly 129 comprises a series of rollers over which the tube 102 passes. The series of rollers are oriented to return the again flattened tube 102 to rollers 121 and 122 to again pass therebetween. Although nip and folding assembly 129 can be designed in various ways, as is well known to those skilled in the art, the assembly in FIG. 4 comprises first rollers 131 for turning the tube around and redirecting it through an angle of approximately 90°, as indicated by arrow 152, and a series of rollers for again turning the tube 102 around and redirecting it through a further angle of approximately 90°, as shown by arrow 153. Flattened tube 102 is thus directed back beneath the rolls 121 and 122 (by further guide rollers not shown) and returned back through rolls 121 and 122 in a second pass.

During the second pass, however, tube 102 is flattened at edges 113 and 114 to define upper and lower surfaces 111 and 112 such that second fabric sheet 101b can be laminated to surface 111 during the second pass by laminate 103b, supplied from laminate supply means 126, as shown in FIG. 3B.

Following the application of second fabric sheet 101b, the tube 102, moving in the direction of arrow 154, is expanded and nipped at a third pair of edges 118 and 119 by directional-orienting device 136 and nip and folding assembly 137, and caused to make a third pass between rolls 121 and 122, as indicated by arrows 156 and 157. During the third pass, fabric sheet 101c is laminated to surface 116 of the tube 102 by laminate 103c from laminate supply means 126 to provide the multilayer, tubular-shaped article 100 of FIG. 3D. Multilayer, tubular-shaped article 100, moving in the direction indicated by arrow 161, can then be cut to suitable lengths for use in any desired application.

As indicated above, by eliminating the fabric sheets 101a, 101b, and 101c and merely applying laminate portions 103a, 103b, and 103c to the tube as it passes through the system of FIG. 4, a uniform, coated, tubular-shaped article can be provided.

It should be understood that the system illustrated in FIG. 4 is intended to be exemplary only and that those skilled in the art could readily design the system in numerous ways. For example, rather than returning the tube to rolls 121 and 122 to be passed therebetween three times in side-by-side relationship, three sets of pressure and chill rolls can be provided through which the tube 102 is sequentially passed. Also, the tube could be directed through the rolls 121 and 122 in three separate passes, if desired. Laminate supply means 126 has been illustrated schematically as it also can take a variety of forms known in the art depending on the construction of the system, the width of the flattened fabric tube relative to the width of the machine, and on other factors.

The system can also be designed to apply coverings to portions of the first pair of surfaces in one coating operation per side. The partially coated tube then is expanded and recollapsed in an orientation such that the uncovered portions of the tube will be positioned on the outer flat surfaces of the reoriented tube. A covering is applied to both remaining uncovered surfaces in one coating operation per side such that the entire outer surface of the tube is covered by the application of four covering portions thereto.

In the method of FIGS. 3A–3D, it is not necessary to coat or laminate at the creased edges of the flattened tube. Accordingly, in the system of FIG. 4, pinch roll 121 is preferably provided with depressed areas, areas formed of readily deformable material or other pressure relieving means adjacent the various edges of the flattened tube to help prevent any substantial force from being applied to the edges of the tube as it passes between rolls 121 and 122. This helps to ensure that the edges 108, 109, 113, 114, 118, and 119 fully disappear when the tube is reexpanded and minimizes the risk of structural damage to the material of the tube at those areas.

By providing a multilayer article having two woven fabric layers and an intermediate solid plastic barrier layer, additional advantageous properties are obtained. Initially, because two layers of woven fabric are used, each fabric layer tends to cover the openings or interstices in the weave pattern of the adjacent layer, thus providing some degree of protection against leakage even in the event that the barrier layer is damaged. By providing two woven fabric layers (with full coverage) having a reduced number of tapes per inch, the number of leak points through the fabrics can be further reduced. Additionally each woven fabric layer can be composed of a plurality of interwoven fabric tapes having different widths, as is illustrated in FIG. 1. In FIG. 1, outer woven fabric layer 21 is composed of perpendicularly arranged interwoven tapes 91 and 92; and inner woven fabric layer 23 is composed of perpendicularly arranged interwoven tapes 93 and 94. Tapes 91 and 92 of outer layer 21 are of substantially equal width and form a plurality of interstices or openings 96 in the weave pattern. Tapes 93 and 94 of inner layer 23 are of different width and, if desired, can both be of a different width than tapes 91 and 92. Tapes 93 and 94 also define a plurality of interstices 97 in the weave pattern.

When layer 21 and layer 22 are placed adjacent one another in forming a multilayer sheet, the different tape widths will cause interstices 96 to generally not line up with interstices 97 such that the tapes of one layer will substantially cover the interstices of the other layer. The result is fewer openings or leakpoints through which liquid or powder can leak in the event of loss in the integrity of the barrier layer.

By forming an article with a plurality of woven plastic layers, it becomes possible to provide layers formed of materials which have different properties for specialized applications. For example, inner layer 23 can be formed of a material that is of an FDA-approved material for storing and transporting chemically active materials; and the outer layer 21 can be formed of a layer that helps protect the fabric against UV degradation.

As indicated previously, it is not necessary that both layers comprise woven fabric layers. One layer can comprise a non-woven fabric while the other layer can comprise a woven fabric, or one layer can comprise a fabric and the second layer can comprise a kraft paper or another material. In addition, the article can be formed of any desired number of layers. For example, an article of flat, tubular or other shape can be manufactured having three or more layers of fabric or another material with an intermediate barrier layer between each layer.

While what has been described constitutes presently most preferred embodiments of the invention, it should be understood that the invention can take various other forms. Accordingly, it should be understood that the invention is to be limited only insofar as is required by the scope of the following claims.

I claim:

1. A method for covering a flexible, tubular-shaped article comprising:
   a. providing a collapsed, flexible, tubular-shaped article which is nipped at a first pair of diametrically opposed locations to define a first pair of outer surfaces joined together at a first pair of edges;
   b. applying a first covering portion to at least one of said first pair of surfaces, said first covering portion being positioned between said first pair of edges and having a width which is less than the width of said one of said first pair of surfaces;
   c. expanding said collapsed tubular-shaped article and nipping said expanded tubular-shaped article at a second pair of diametrically opposed locations to generally collapse said tubular-shaped article upon itself to define a second pair of opposed outer surface joined together at a second pair of edges, said second pair of locations being displaced from said first pair of locations;
   d. applying a second covering portion to at least one of said second pair of surfaces, said second covering portion being positioned between said second pair of edges and having a width which is less than the width of said one of said second pair of surfaces; and
   e. repeating steps (c) and (d) as necessary until the entire outer surface of said tubular-shaped article has a coating layer applied thereto.

2. The method of claim 1 wherein said applying steps comprise applying laminate material to said surfaces.

3. The metod of claim 1 wherein said applying steps comprise extrusion coating said surfaces.

4. The method of claim 1 wherein said flexible, tubular-shaped article comprises a tubular-shaped, plastic fabric.

5. The method of claim 1 wherein said flexible, tubular-shaped article comprises a tubular-shaped article of continuous length, and wherein said covering portions comprise coating portions applied thereto in a continuous extrusion-coating process.

6. The method of claim 1 wherein steps c and d are repeated one additonal time and wherein said applying steps comprise applying first, second, and third covering portions to one of a first, second, and third pair of surfaces, respectively, each of said covering portions having a width greater than one-third the circumference of the tubular-shaped article.

7. The method of claim 6 wherein said nipping steps comprise nipping said tubular-shaped article at locations which are displaced from one another by approximately one-third of the circumference of said tubular-shaped article.

8. The method of claim 1 wherein said applying steps comprise laminating sheets to one of each of said pairs of surfaces until the entire outer surface of said tubular-shaped article has a sheet laminated thereto to provide a multilayer, tubular-shaped article having inner and outer layers and an intermediate laminate layer.

9. The method of claim 8 wherein said tubular-shaped article and said sheets comprise a plastic fabric.

10. The method of claim 9 wherein said tubular-shaped article comprises a plastic fabric and at least one of said sheets comprise kraft paper.

11. The method of claim 8 wherein said tubular-shaped article comprises a tubular-shaped article of continuous length, and wherein said sheets are laminated thereto in a continuous extrusion-laminating process.

12. The method of claim 1 and further including the step of providing pressure relieving means adjacent the edges of the collapsed tube for preventing substantialy forces from being applied to the edges of the tube during said applying steps.

13. The method of claim 1 wherein said applying steps comprise applying coverings to portions of the first and second pairs of surfaces in one covering operation per side whereby the entire surface of the tube is covered by the applicatio of four covering portions thereto with one tube expansion and reorientation occurring after the first covering portion has been applied to both of the first pair of surfaces.

14. A method for covering a flexible, tubular-shaped article comprising:
   a. providing a flexible, tubular-shaped article;
   b. applying an initial covering to a portion of said tubular-shaped article to provide a partially-covered, tubular-shaped article having an initially covered portion and an uncovered portion;
   c. nipping the partially-covered, tubular-shaped article at a pair of diametrically opposed locations to generally collapse the partially-covered tubular-shaped article upon itself to define a pair of flattned outer surfaces joined together at a pair of creased edges, said locations being chosen such that said initially covered portion extends around at least one of said pair of creased edges and includes a section thereof on each of said pair of flattened outeer surfaces, and said uncovered portion is positioned on at least one of said flattened outer surfaces; and
   d. applying a further covering to the uncovered portion of said partially-covered, tubular-shaped article on said at least one of said flattened outer surfaces, said further covering being positioned between and spaced from said pair of creased edges and being contiguous with the section of said initially covered portion which extends aroudn said creased edge and onto said at least one of said flattened outer surfaces.

15. The method of claim 14 wherein said step of applying a further covering comprises applying a further covering to an uncovered portion on each of said pair of flattened outer surfaces.

16. The method of claim 14 wherein said further covering and said contiguous section of said initally covered portion overlap one another to provide a covering on said flexible, tubular-shaped article that is reinforced at the seam between said initially covered portion and said further covering.

17. The method of claim 14 wherein said further covering comprises an extrusion coating.

18. The method of claim 14 wherein said flexible, tubular-shaped article comprises a plastic fabric.

19. The method of claim 14 wherein said flexible, tubular-shaped article comprises a tubular-shaped article of continuous length, and wherein said initial and further coverings are applied thereto in a continuous covering process.

* * * * *

UNITED STATES PATENT AND TRADEMARK OFFICE
CERTIFICATE OF CORRECTION

PATENT NO. : 4,759,814

DATED : July 26, 1988

INVENTOR(S) : Donald P. Katz

It is certified that error appears in the above-identified patent and that said Letters Patent is hereby corrected as shown below:

In col. 11, line 35 (claim 1, line 17), delete "face" and insert -- faces -- therefor; line 44 (claim 1, line 26), delete "(c)" and insert -- c -- therefor; line 44 (claim 1, line 26), delete "(d)" and insert -- d -- therefor.

In col. 11, line 49 (claim 3, line 1), delete "metod" and insert -- method -- therefor.

In col. 12, line 21 (claim 12, line 3), delete "substantialy" and insert -- substantial -- therefor.

In col. 12, line 28 (claim 13, line 5), delete "applicatio" and insert -- application -- therefor.

In col. 12, line 42 (claim 14, line 11), delete "flattned" and insert -- flattened -- therefor; line 48 (claim 14, line 17), delete "outeer" and insert -- outer -- therefor; line 57 (claim 14, line 26), delete "aroudn" and insert -- around -- therefor.

UNITED STATES PATENT AND TRADEMARK OFFICE
CERTIFICATE OF CORRECTION

PATENT NO. : 4,759,814

DATED : July 26, 1988

INVENTOR(S) : Donald P. Katz

It is certified that error appears in the above-identified patent and that said Letters Patent is hereby corrected as shown below:

In col. 12, line 66, (claim 16, line 2), delete "initally" and insert -- initially -- therefor.

Signed and Sealed this

Sixth Day of June, 1989

Attest:

DONALD J. QUIGG

Attesting Officer

Commissioner of Patents and Trademarks